//  3,050,512
PURIFICATION OF POLYMERS BY TREATMENT WITH NAPHTHENIC ACIDS
Harold A. Wright, Beaver, Pa., assignor to Koppers Company, Inc., a corporation of Delaware
No Drawing. Filed June 12, 1959, Ser. No. 819,830
12 Claims. (Cl. 260—93.7)

This invention relates to a process for obtaining polymer free of catalyst from polymer mixtures produced by the polymerization of ethylenically unsaturated compounds in the presence of catalysts which contain one or more heavy metal components. The invention is more particularly concerned with the separation of catalyst components from polymers produced in the presence of catalysts which are formed by mixing a salt of a metal of groups IVB, VB or VIB of the periodic table with a compound having a hydrocarbon group attached directly to an aluminum, zinc or magnesium atom.

Various olefins, for example ethylene and propylene, may be polymerized to high molecular weight polymers at relatively low pressures and temperatures in a process commonly known as the low pressure process, involving a catalyst complex of two components. One component of the catalyst complex is a compound having a hydrocarbon group attached directly to an atom of aluminum, magnesium or zinc. Typical components of this type are triethyl aluminum, triisobutyl aluminum, diethyl aluminum chloride, diethyl aluminum hydride, diisobutyl aluminum hydride, diethyl zinc, and dimethyl magnesium. The other component of the catalyst complex is a salt of a metal of groups IVB, VB or VIB of the periodic table; typical salts being titanium tetrachloride, titanium trichloride, vanadium tetrachloride or zirconium acetylacetonate.

The polymerization conditions generally involve temperatures of less than 100° C. and pressures of less than 100 atmospheres. In a typical polymerization a temperature of approximately 50° C. and a pressure of two atmospheres is used. The reaction is generally conducted in a liquid organic medium. The organic medium is inert to the catalyst and the polymer is not soluble in it. After the polymerization has been completed, the polymer slurry, consisting of ethylene, polyethylene, the organic medium and catalyst material, is removed from the reactor. The catalyst component of the slurry is rendered inactive by adding water or alcohol to the slurry. The solids are then separated from the liquid medium. These solids, while substantially polymers of ethylene, usually contain catalyst residues.

These polymers, produced by a low pressure process, have molecular weights which may range from about 10,000 to more than 3,000,000 depending both on reaction conditions and on catalyst components and concentrations. These polymers have relatively high densities of from 0.95 to 0.97. The linearity of the polymer is high usually having less than ten side chains per thousand carbon atoms of the main chain.

Although these polymers of ethylene have highly desirable properties, a serious drawback to their use exists. If the catalyst components are not substantially eliminated from the polymer, these components cause serious deleterious effects in the polymer. The catalyst or catalyst decomposition products apparently cause the polymer to become brittle, change color and break down when the polymer is exposed to heat in further processing, such as extrusion, injection molding, vacuum thermoforming, etc.

One solution to the problem of catalyst removal involves a process wherein a reagent, i.e. alkoyl peroxides, aroyl peroxides, hydrogen chloride, hydrogen peroxide, and chlorine, which renders the heavy metal constituents of the catalyst residue reactive with fatty acids, is added to the reaction slurry. Thereafter, a stoichoimetric quantity of a fatty acid is added to the slurry to form a salt with the heavy metal. The salt is soluble in the reaction medium. The polymer is then separated from the solvent by filtration or other convenient means, and thereafter washed and dried. A relatively catalyst free polymer is obtained by this process.

This process unfortunately has certain inherent deficiencies. For example, if chlorine or hydrogen chloride be used as the reagent to render the heavy metal reactive with the fatty acid, there is a possibility that the Cl− ion, a corrosive material, may be produced and remain with the polymer. If hydrogen peroxide be used, it may decompose to form as one of the decomposition products, water, and since water is a polar solvent, it is quite difficult to remove the concurrently formed heavy metal salts from the water, and so a possibility exists that a water solution of the heavy metal salts will remain entrained with the polymer. If organic peroxides be used, they may form decomposition products which will react with newly added catalyst components so that if the liquid medium is to be reused for polymerization purposes the use of greater amounts of catalyst in order to compensate for that portion of the catalyst which combines with the decomposition products is necessary.

It has now been found that both the heavy metal component and any aluminum component of the catalyst may be removed from the polymer prepared according to the low pressure process by adding naphthenic acids to the polymerization mixture, which acids react with the metal constituents of the catalyst to form soluble salts. These salts may thereafter be readily separated from the polymer by filtration, since they are soluble in the organic medium. Repeated washing of the polymer with fluids such as hexane, heptane and kerosene, insures complete removal of the napththenic salts.

The naphthenic acids contemplated by this invention are monobasic carboxylic acids of the general formula RCOOH, where R is a radical derived from cyclopentane or a homologue of cyclopentane or a bicyclic cyclopentane derivative. Their molecular weights may vary from 200 to 500. The carboxylate groups are most often attached to a primary carbon atom of a side chain. The cyclopentane group may have lower alkyl groups attached in various ways, and in the higher molecular weight naphthenic acids, double naphthenic acids may be present, or predominate. Typical naphthenic acids may be more accurately described by the following structural diagrams.

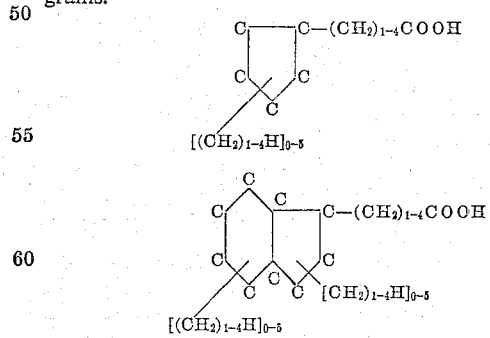

The naphthenic acids combine with the titanium, depending upon whether the valence of the titanium is three or four, to form $(RCOO)_3Ti$ or $(RCOO)_4Ti$. The naphthenic acids combine with the aluminum to form $(RCOO)_3Al$. The preferred amount of naphthenic acids is a greater than the stoichiometric quantity based on the combined aluminum and titanium present, preferably an excess of about 10%. An excess of naththenic acids is desirable for two reasons; one reason is that it has been found that there may be an incomplete mixing of the naphthenic acids with the polymerization slurry, and in order to insure complete contact with the catalyst, an excess of the acid is desirable. The other reason is that a sufficient quantity of the acid must be added to compensate for slight variations in catalyst concentration. Although greater amounts of naphthenic acids might be used, no advantage is to be gained thereby. Although lesser amount may be used, there is some danger that an incomplete mixing will result, permitting a portion of the catalyst to remain in the polymer.

The stoichiometric quantity of naphthenic acids may be calculated from the original catalyst charge since the amount of catalyst per volume of reaction medium remains essentially constant throughout the polymerization reaction, and that amount plus an excess is then added to the reaction slurry. Thereafter, the reaction slurry is filtered and the recovered polymer washed as desired. The resulting polymer is substantially catalyst free.

The practice of this invention has the advantage of permitting the production of a catalyst-free polymer without the deficiencies which were discussed above, inherent in prior art processes. The present process is, when compared to the process using fatty acids, of a very marked superiority, in that the only addition which is made to the reaction slurry is the salt forming material, i.e. naphthenic acids, whereas in the other process two separate and distinct additions must be made, at least one of which may produce deleterious side effects. Further, the present process is advantageous in that in addition to the heavy metal components of the catalyst, it also removes any aluminum components present.

The advantages of this invention are the substantially complete removal of both the heavy metal component and the light metal component of the catalyst. A further particular advantage of this invention is that it permits the economic recovery and reuse of the organic reaction medium. The boiling point of hexane, for example, a commonly used organic reaction medium, is 69° C. while the boiling temperature of the naphthenic acids is in the range of 200–370° C. The wide difference in boiling points permits the ready separation by simple distillation of substantially all of the reaction medium from the naphthenic salts and excess naphthenic acids. The naphthenic acids and salts are left as bottoms, while the organic reaction medium, substantially contaminant free, is taken overhead, and may be reused as recovered.

The following examples are illustrative but not restrictive of the present invention.

*Example I*

Polyethylene was prepared according to the low pressure process by polymerizing ethylene of 99.4% purity in the presence of an admixture of two mols of diethyl aluminum chloride to one mol of titanium tetrachloride. The reaction was conducted using normal hexane as the reaction medium. The concentration of the tianium was nine millimols per liter of hexane. The temperature of the reactor was 50° C. and the pressure was two atmospheres. Upon completion of the reaction the slurry containing the hexane, polyethylene, and catalyst material was withdrawn from the reactor. The slurry was separated into two portions.

One portion of the slurry, 2.5 liters, was treated with a stoichiometric quantity plus 10%, 13 grams, based on the amount of combined metals present, of naphthenic acids. The resulting mixture was refluxed at atmospheric pressure at approximately 69° C. for one half hour. The solvent was removed by pressure filtration and the filtrate washed several times with hexane. The polymer was then dried. The polymer's yellowness was 6.0 and the brightness 71.0 when determined by the method described in the instruction manual for the P.P.G.I.D.L. Color-Eye, Model C, published by Instrument Development Laboratories, Inc., Needham Heights 14, Mass. The percent ash was determined and found to be 0.035. The corrosiveness of the polymer was determined by heating five grams of dried polyethylene to 540°±10° F. in a crucible which was covered with a polished plate of DME-2 steel. The heating was carried out for exactly twenty minutes. Any oxide layer formed on the steel plate was removed with gluconic acid solution, then reduced to the ferrous state with hydroxylamine hydrochloride. The total iron was then determined colorometrically after the addition of ortho-phenanthroline. The amount of iron present determines the corrosiveness of the polyethylene. If the iron is from 0–0.215 mg. the sample is considered as being non-corrosive. If the amount of iron present is above 0.215 mg. then the polymer is considered as being corrosive. In this instance the amount of iron present was 0.210 mg. and the polymer is thus considered as non-corrosive.

Another portion of the polymerization slurry was repeatedly washed with methanol in an attempt to remove catalyst components. The polymer was then separated by pressure filtration and dried. Determinations were made according to the above procedure; the brightness was 71.3, the yellowness 11.4, the percent ash was 0.29 and the corrosiveness was 0.37 mg. of iron.

*Example II*

Titanium tetrachloride in an amount of 0.53 gram was dissolved in 500 milliliters of hexane. Sixteen milliliters of a 10% solution of naphthenic acids, having an acid number of 263, in hexane were added, and the solution was allowed to stand for one half hour, and then was heated to reflux for ten minutes. Thereafter the solution was allowed to cool to room temperature. Visual examination indicated that there was no suspended matter in the solution, thus indicating that all of the naphthenic acid salts of titanium are soluble in hexane. Titanium trichloride was substituted for the titanium tetrachloride with similar results.

Diethyl aluminum chloride in an amount of 0.33 gram was dissolved in 500 milliliters of hexane. Eleven milliliters of the previously described naphthenic acids solution were added. The mixture was then heated to reflux for fifteen to twenty minutes. After cooling to room temperature, visual examination showed that the solution was clear, indicating that all of the aluminum naphthenic acid salts formed were soluble in hexane.

This example demonstrates that all the metal components contained in the normal low pressure catalyst system are reactive with naphthenic acids to form salts which are soluble in hexane.

*Example III*

A synthetic reaction medium was prepared by adding 18.2 millimols of a catalyst consisting of diisobutyl aluminum chloride and titanium tetrachloride in a molar ratio of 1.5:1 to one liter of normal hexane. A suspension of these materials in the hexane resulted. A stoichiometric quantity plus 10% of naphthenic acids were added to the suspension. The suspension was then heated to reflux and held at that temperature for 30 minutes, and thereafter cooled. A clear solution resulted. This solution was allowed to stand over night. An examination the following day showed that the solution remained clear.

This example further demonstrates that the metallic components contained in the low pressure polymerization process catalyst system are reactive with the naphthenic acids to form salts soluble in hexane.

*Example IV*

Polypropylene was prepared according to the previously described low pressure process by bubbling propylene of 99% purity through an admixture of 27 millimols of alpha titanium trichloride and 54 millimols of triethylaluminum in three liters of normal heptane, at the rate of 50 liters per hour. This mixture was allowed to stand for one hour at room temperature prior to use, and was maintained at 70° C. during the polymerization. Upon completion of polymerization, 65 grams of naphthenic acids of acid number 230 in 100 milliliters of normal heptane were added to the slurry consisting of catalyst components, polypropylene and normal heptane. The slurry was kept at 70° C. for 20 minutes during which time the dark brown color changed to reddish orange, and the liquor became clear. The mixture was then filtered and the filter cake reslurried in fresh normal heptane, heated to 70° C. for 20 minutes, and filtered. The reslurrying was repeated several times and the filtrate was tested with chromotropic acid reagent, and no color developed, indicating that all titanium had been removed, since this reagent is sensitive to 2 p.p.m. of titanium.

*Example V*

Polyethylene was prepared according to a continuous process such as described in Petroleum Refiner, volume 36, No. 11, page 278. As slurry exited from the reactor periodic determinations of the amount of titanium and aluminum present were conducted. A continuous addition of naphthenic acids based on the amount of titanium and aluminum present was made. The resulting mixture was then refluxed and thereafter the reaction medium removed by filtration. The polymer was then washed several times with hexane. The reaction medium was then distilled in order to drive off the hexane as overhead, leaving any naphthenic acids and salts present as bottoms. On exiting from the distillation column the hexane was sampled and found to contain no naphthenic acids. The distilled hexane was then recycled to the polymerization reactor. The polymer, when tested by the methods of Example I, was found to have the following values: Percent ash 0.061 mg., corrosiveness 0.09 mg., and color; yellowness 8.1, brightness 67.2.

The foregoing has described a novel method of removing from polymers, produced according to the low pressure process, the deleterious catalyst components, thereby yielding an improved polymer with the additional advantage of a simplified reaction medium recovery system.

I claim:

1. A process for removing catalyst constituents from a solid polymerization product in a polymerization slurry, said polymerization slurry being obtained by polymerizing ethylenically unsaturated compounds in the presence of a catalyst dispersed in an anhydrous inert liquid organic reaction medium, said catalyst consisting of an admixture of a compound having at least one hydrocarbon group attached directly to a metal atom selected from the group consisting of zinc, aluminum, and magnesium, and a compound which is a halide of a metal of group IVB, of the periodic table, consisting of treating the said polymerization slurry with naphthenic acid to form metal salts with said metal constituents, said metal salts being soluble in said inert reaction medium and thereafter separating polymer from said metal salt containing reaction medium said naphthenic acid having a molecular weight of about 200 to about 500, and said naphthenic acid being selected from the group consisting of compounds having the formula:

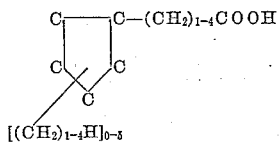

and compounds having the formula:

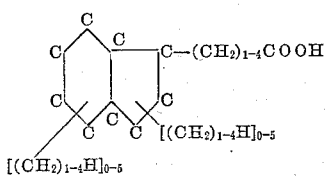

2. The process of claim 1 wherein the ethylenically unsaturated compound is ethylene.

3. The process of claim 1 wherein the ethylenically unsaturated compound is propylene.

4. A process for removing catalyst constituents from a solid polymerization product in a polymerization slurry, said polymerization slurry being obtained by polymerizing ethylenically unsaturated compounds in the presence of a catalyst dispersed in an anhydrous inert liquid organic reaction medium, said catalyst consisting of an admixture of a compound having at least one hydrocarbon group attached directly to an aluminum atom and a compound which is a halide of a metal of group IVB of the periodic table, consisting of treating said polymerization slurry with a greater than stoichiometric amount based on said metals of naphthenic acid to form metal salts with said metal constituents, said metal salts being soluble in said inert reaction medium, and thereafter separating polymer from said metal salt containing reaction medium, said napthenic acid having a molecular weight of about 200 to about 500, and said naphthenic acid being selected from the group consisting of compounds having the formula:

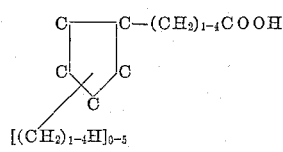

and compounds having the formula:

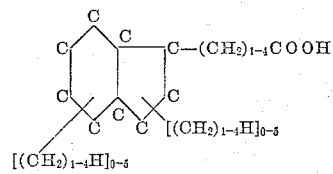

5. A process for removing catalyst constituents from a solid polymerization product in a polymerization slurry, said polymerization slurry being obtained by polymerizing in a polymerization zone ethylenically unsaturated compounds in the presence of a catalyst dispersed in an anhydrous inert liquid organic reaction medium, said catalyst consisting of an admixture of a compound having at least one hydrocarbon group attached directly to a metal atom selected from the group consisting of aluminum, zinc, and magnesium, and a compound which is a halide of a metal of group IVB of the periodic table, consisting of treating the said polymerization slurry with at least a stoichiometric amount based on said metals of naphthenic acid to form naphthenic acid metal salts with said metal constituents, said metal salts being soluble in said inert reaction medium, separating polymer from said metal salt containing reaction medium and thereafter separating said naphthenic acid and said naphthenic acid salts from said inert reaction medium and returning said reaction medium to said polymerization zone, said naphthenic acid having a molecular weight of about 200 to about 500, and said naphthenic acid being selected from the group consisting of compounds having the formula:

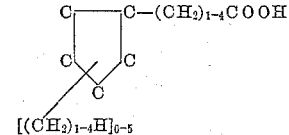

and compounds having the formula:

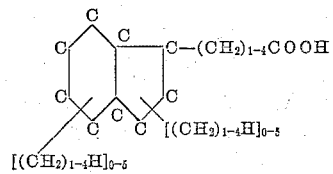

6. The process of claim 5 wherein the metal atom is aluminum.

7. The process of claim 4 wherein the ethylenically unsaturated compound is ethylene.

8. The process of claim 4 wherein the ethylenically unsaturated compound is propylene.

9. A process for removing catalyst constituents from a solid polymerization product in a polymerization slurry, said polymerization slurry being obtained by polymerizing ethylenically unsaturated compounds in the presence of a catalyst dispersed in normal hexane, said catalyst consisting of an admixture of diethyl aluminum chloride and titanium tetrachloride, consisting of treating said polymerization slurry with at least a stoichiometric amount based on said titanium and aluminum of naphthenic acid to form metal salts with said metals, said metal salts being soluble in said normal hexane and thereafter separating polymer from said metal salt containing normal hexane, said naphthenic acid having a molecular weight of about 200 to about 500, and said naphthenic acid being selected from the group consisting of compounds having the formula:

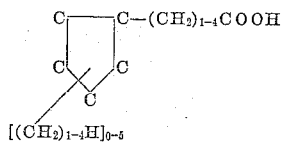

and compounds having the formula:

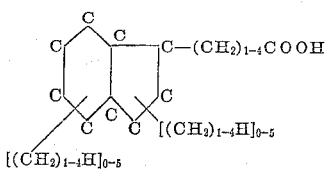

10. The process of claim 9 wherein the ethylenically unsaturated compound is ethylene.

11. A process for removing catalyst constituents from a solid polymerization product in a polymerization slurry, said polymerization slurry being obtained by polymerizing ethylenically unsaturated compounds in a polymerization zone in the presence of a catalyst dispersed in normal hexane, said catalyst consisting of an admixture of diethyl aluminum chloride and titanium tetrachloride, consisting of treating said polymerization slurry with at least a stoichiometric amount based on said titanium and said aluminum of naphthenic acid to form salts with said titanium and aluminum constituents, said salts being soluble in said normal hexane, separating polymer from said salt containing normal hexane, and thereafter separating from said salt containing normal hexane said naphthenic acid salts and said naphthenic acid, thereafter returning said normal hexane to said polymerization zone, said naphthenic acid having a molecular weight of about 200 to about 500, and said naphthenic acid being selected from the group consisting of compounds having the formula:

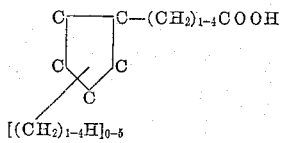

and compounds having the formula:

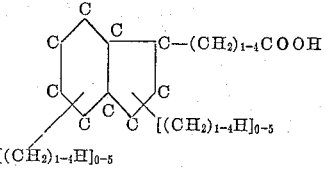

12. A process for obtaining polymer free of catalyst components where said polymer is suspended in a polymerization slurry that includes an anhydrous inert liquid organic reaction medium and a polymerization catalyst consisting of an admixture of a compound having at least one hydrocarbon group attached directly to an aluminum atom, and a compound which is a halide of a metal of group IVB of the periodic table, which process consists of adding to said slurry at least a stoichiometric amount of naphthenic acid to form metal salts with said catalyst, which salts are soluble in said inert reaction medium and thereafter separating polymer from said slurry, said naphthenic acid having a molecular weight of about 200 to about 500, and said naphthenic acid being selected from the group consisting of compounds having the formula:

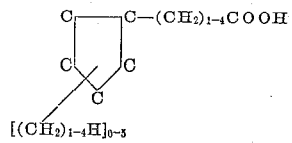

and compounds having the formula:

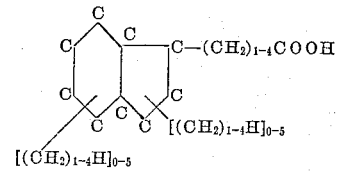

References Cited in the file of this patent

UNITED STATES PATENTS

| | | |
|---|---|---|
| 2,814,610 | Braidwood et al. | Nov. 26, 1957 |
| 2,827,445 | Bartolomeo et al. | Mar. 18, 1958 |
| 2,886,561 | Reynolds et al. | May 12, 1959 |
| 2,908,675 | Lindland | Oct. 13, 1959 |

OTHER REFERENCES

The Petroleum Acids and Bases, Lochte et al., Chemical Publishing Co., Inc., N.Y. (1955). Pages 11, 115 and 116 only needed.